United States Patent [19]
Rottier et al.

[11] 3,953,717
[45] Apr. 27, 1976

[54] TEST AND DIAGNOSIS DEVICE

[75] Inventors: Marcel René Rottier, Rosny, Bois; Jacques Michel Jean Bienvenu, Paris, both of France

[73] Assignee: Compagnie Honeywell Bull (Societe Anonyme), Paris, France

[22] Filed: Aug. 30, 1974

[21] Appl. No.: 502,118

[30] Foreign Application Priority Data

Sept. 10, 1973 France .............................. 73.32504

[52] U.S. Cl. .......................................... 235/153 AK
[51] Int. Cl.² .......................................... G06F 11/00
[58] Field of Search ............ 235/153 AK; 340/172.5

[56] References Cited

UNITED STATES PATENTS 3,557,315 1/1971 Kobus et al. ................ 235/153 AK
3,692,989 9/1972 Kandiew ...................... 235/153 AK
3,810,120 5/1974 Huettner et al. ............. 235/153 AK
3,838,260 9/1974 Nelson ......................... 235/153 AK

*Primary Examiner*—Charles E. Atkinson
*Attorney, Agent, or Firm*—Lowe, King, Price & Markva

[57] ABSTRACT

A first test and diagnosis device to check a data processing unit. The device includes means for manually testing and passing diagnostics on the first unit, as well as other means for automatically testing and diagnosing the first unit through a second data processing unit. The latter means are comprised of maintenance circuitry, contained within the first unit and linked to the second unit in such a way as to allow the second unit to conversationally interact with the first unit. This interaction is comprised of a sequence of input and output microdialogues performed by means of the maintenance circuits. The test and diagnosis microprograms may be contained in either unit.

10 Claims, 3 Drawing Figures

TEST AND DIAGNOSIS DEVICE

BACKGROUND OF THE INVENTION

1. Field of the Invention

The present invention relates generally to test and diagnosis device for a data processing unit and more specifically to maintenance circuits incorporated within such a device for enabling the detection and localization of abnormal conditions within such a unit via another data processing unit.

2. Description of the Prior Art

The increasing complexity of systems of data processing and especially of the central units contained in these systems renders more and more difficult the execution of their checking and maintenance by specialist technicians. In order to react as rapidly as possible to trouble, the technicians must be furnished with equipment which can be connected to plug-in units of the machine needing repair in order to carry out predetermined tests. These tests are effected by numerous manual operations, often lengthy, which cause a great loss of time.

In order to correct this loss of time, means have been developed for detecting trouble automatically and localizing them at the level of the various functional units of the system during the course of data processing, thus facilitating the work of the repairman. Means have likewise been developed for testing a system before it starts to carry out a data process, that is, at the time the system starts. Such means are described in the U.S. Pat. application Ser. No. 450,936, filed Mar. 13, 1974, entitled "Testing System For A Data Processing Unit" by Gilles Jean Marcel Bottard, which corresponds to the French Pat. appliction No. 73 09558, filed on the Mar. 16, 1973. These means prevent data processing under abnormal conditions of operation of a system. In this manner time may be gained, since trouble is reacted to immediately and before any processing is started.

Localization of trouble at the level of a functional unit of the system facilitates the repairman's work, but the task of looking for a fault at the level of one element of the functional unit in question remains and may take a long time. In order to reduce by an appreciable degree the time of intervention of the repairman, means have been developed consisting in carrying out a diagnosis by the execution of tests on all the elements of a functional unit in trouble, which enable all the symptoms of a fault to be collected. If a dictionary of faults has been previously established by simulation of all foreseeable faults, it is possible to localize a "hardware" fault at the level of the smallest interchangeable element of a data processing unit by identification of the symptoms collected.

Certain systems can test themselves automatically by executing programs and microprograms of tests written in the permanent memory of their central unit. In the case of certain configurations in which a relatively large number of peripheral units are connected to the central unit of a system, it is necessary to reserve a large place in the memories for the execution of tests. Under these conditions there is a need to provide for the possibility of carrying out complementary tests under control external to the system in question. These tests can be made either manually by a maintenance panel or automatically by a test and diagnosis device connected to the system to be tested. Such devices are in general costly and too specialized to be employed, for example, in the course of manufacture. In order to connect such a device to the system to be tested, there must be provided special means of adaptation which change depending upon the type of system to be tested. A type of adapter has been developed as an element of a universal system for enabling communication over great distances with a number of external devices by means of a communication terminal. An adapter of this type is designed, for example, for sending test data to the system to be tested at rest. This adapter localizes the faults by comparison of the data resulting from the test of the system with reference data sent by the external test device. The various data transfers are carried out by manual commands from a maintenance panel associated with the system to be tested. Such adapters do not enable complete and automatic test of all of the central unit of a system nor an automatic diagnosis, since the state signals of the various registers of the unit to be tested are conveyed through the maintenance panel. This is so even in the case of a transmission towards an external device connected to the adapter.

OBJECTS OF THE INVENTION

It is an object of the present invention therefore to provide an improved test and diagnosis apparatus for a data processing unit.

It is another object of the present invention to enable automatic execution of tests and diagnoses on a data processing unit in operation.

It is another object of the invention to enable a diagnosis of a data processing unit to be carried out at a distance from the unit being tested.

It is another object of the invention to enable manual control of all testing operative via a maintenance panel which is associated with a data processing unit being tested.

It is another object of the invention to enable test and diagnosis of a data processing unit to be started automatically upon detection of at least one fault in this unit.

These and other objects will become apparent from the following descriptions of the preferred embodiment of the invention when read in conjunction with the attached drawings contained herewith.

SUMMARY

The test and diagnosis device for a data processing unit including a plurality of operative elements comprises means external to a first data processing unit for manual control and display of data for manually testing and diagnosing the unit in the event of trouble. Interconnection circuits are contained in the first unit and are connected to the various elements of the unit. The first unit is connectable to a second data processing unit by a first channel group for bidirectional transmission of control signals for exchange of information between the two units. A second channel group is for transmission of information from the second unit to the first unit. A third channel group is for transmission of information from the first unit to the second unit. The invention is characterized in that said device comprises four additional maintenance circuits in the interconnection circuits and through which the first unit is controllably connected to the second unit. Communication between the two units is by a combination of signals (representing information such as data, addresses, instructions, orders, control or test words and like coded unitary signals) transmitted sequentially and alternately from one unit to the other under the control of the interconnection circuits. The second unit acts as master over the first unit and dialogues with the first unit by a succession of input-output microdialogues which are effected by the plurality of maintenance circuits.

A signal of an abnormal operation condition is sent by at least one element of the first unit to a first of the maintenance circuits. An exchange of signals is effected between the second unit and this circuit through the first channel group so as to validate each input microdialogue. This is effected by the transmission of signal through the second channel group to the second of the maintenance circuits. It is followed by the transmission of signals through the same channels to the third of the maintenance circuits which is under the control of the second circuit. Each output microdialogue is effected by the transmission of signals through the second channel group to the second circuit. It is followed by the transmission of signals from to the fourth of the maintenance circuits (which is also under the control of the second circuit) through the third channel group to the second unit. In this manner the first unit may be tested and diagnosed automatically.

DESCRIPTION OF THE PREFERRED EMBODIMENT

Figure 1:
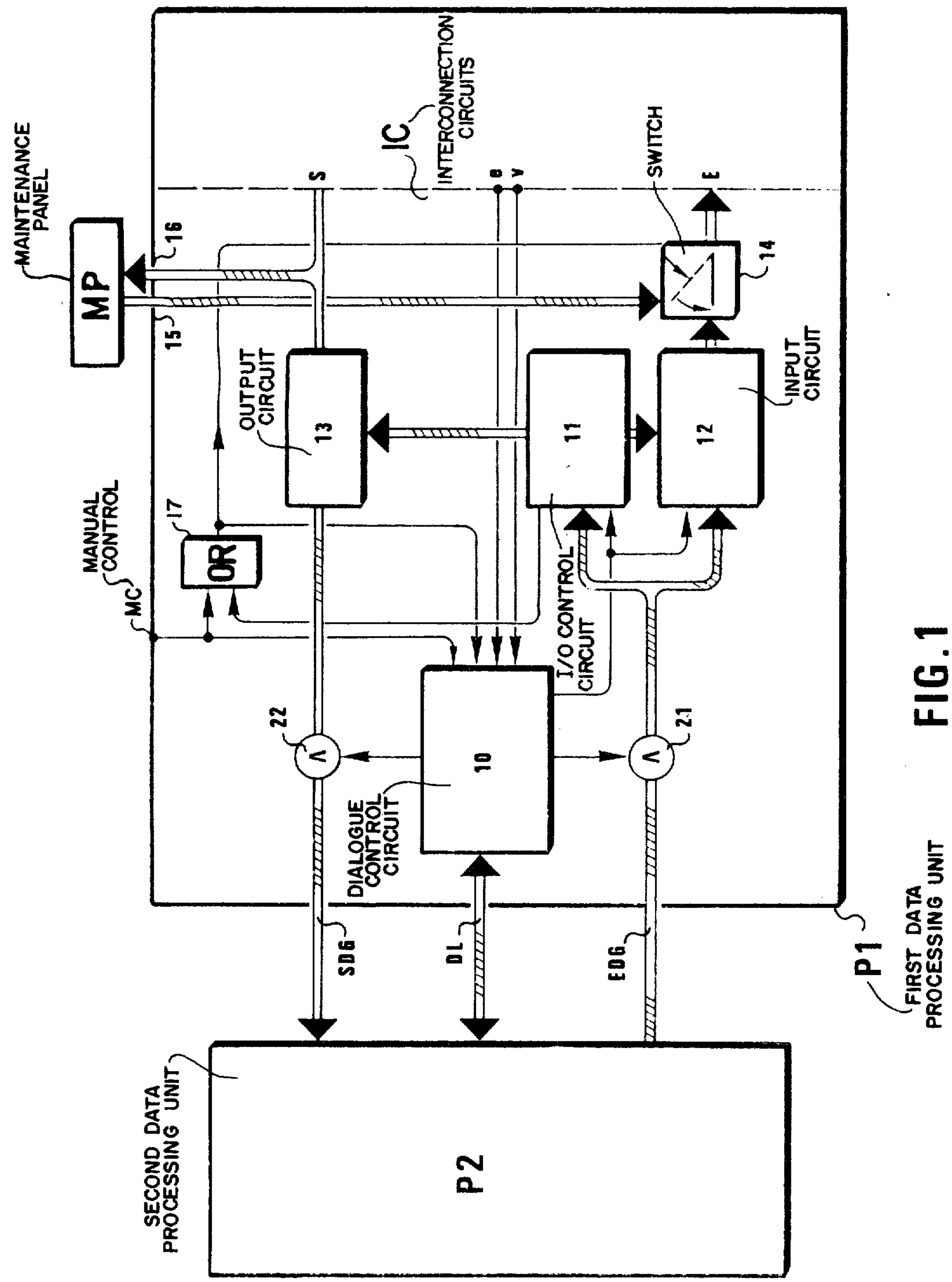
FIG. 1 is a schematic diagram of a test and diagnosis device for a data processing unit in accordance with the invention.

The test and diagnosis device for a data processing unit P1 as represented in FIG. 1 comprises interconnection circuits IC contained in a first data processing unit P1. Means MP of manual control and of display (such as a maintenance panel) are connected to the unit P1 through inputs 15 and outputs 16 of the circuits IC. The input of data and instructions made through the means MP (and the inputs 15 of the circuits IC) in order to ensure that functions of maintenance of the unit P1 are effected in a manner known to those skilled in the art. Similarly the output of data made through the outputs 16 of the circuits IC for their display by the means MP for the purpose of diagnosis is effected in a known manner. The transfer of the data and instructions to be introduced into one or a number of elements of the unit P1 is done through the channels E while the transfer of the data withdrawn from one or a number of elements of the unit P1 is done through the channels S. Thus in the form of signals proceeding from the means MP are sent to the unit P1 through the inputs 15 of the circuits IC and the channels E, while the unit P1 sends information to the means MP through the channels S and the outputs 16 of the circuits IC.

In FIG. 1 the test and diagnosis device comprises a second data processing unit P2 which (for example, through access to a test and diagnosis program in the unit P1,) transmits a succession of instructions and data to the unit P1 so as to collect at least one piece of information sent by the unit P1 which enables a diagnosis to be carried out in the event of trouble in the unit P1. Communication by the unit P1 with the unit P2 consists in an exchange of signals controlled by the unit P2. The unit P2 functions as master with respect to the unit P1, through a first group of channels DL connected to the unit P2 and to a circuit 10 (for checking dialogue) included in the circuits IC of the Unit P1. The signals check the dialogue which is carried out between the unit P1 and the unit P2 through second group of input channels EDG and through a third group of output channels SDG. The unit P2 transmits test and diagnosis instructions and data to the unit P1 through the channels EDG while the unit P1 transmits, also under checking from the circuit 10, test and diagnosis data to the unit P2 through the channels SDG. The circuit 10 validates the input of information through channels EDG by a first group of AND gates 21 and the output of information through the channels SDG by a second group of AND gates 22. The channels EDG are connected to a circuit 11 for control of input-output microdialogues and to a circuit 12 for input microdialogue, both belonging to the circuits. The circuits likewise comprise a circuit 13 for output microdialogue connected by its outputs to the channels SDG and by its inputs to the channels S. The circuits 12 and 13 are both controlled by the circuit 11. The circuits 11 and 12 are validated by the circuit 10. A switch 14 connects the channels E either to the inputs 15 of the circuits or to the outputs of the circuit 12. A signal proceeding from an OR gate 17 in the circuits IC controls the switch 14. The signal is emitted by the OR gate 17 when the unit P2 is connected to the unit P1 by a manual control MC or by and an automatic control proceeding from the unit P2 by means of the circuit 11. The functioning of the circuit 10 is ensured by the channel *v* connected to the clock circuits in the unit P1. The manual control MC (for connection of the unit P2 to the unit P1) is also connected to the circuit 10. Also connected to the circuit 10 is a channel *e* through which the unit P1 signals that an abnormal operational condition has just been produced in at least one of its elements. Through the presence of a signal on the channel *e* or of a signal proceeding from MC or with the output of the OR gate 17, the unit P2 accedes to a request to run a program of test and diagnosis of the unit P1 and the validation of the input-output microdialogues is effected through the circuit 10.

Execution of the program is carried out by a succession of input-output microdialogues. Each input microdialogue is effected by a first set of signals sent to the circuit 11 by the channels EDG and through a second set of signals sent to the circuit 12 through the channels EDG. The circuit 11 having received the first set of signals enables (controls) the circuit 12 to receive the second set of signals. Each output microdialogue is effected through a first signal group sent to the circuit 11 through the channels EDG and through at least a second signal group transmitted through the circuit 13 to the channels SDG. The circuit 11 having received the first signal group enables (controls) the circuit 13 so that it transmits the second signal group to the unit P2 through the channels SDG in the course of the same microdialogue.

As shown in FIG. 1, circuit 12 is comprised of the circuits 121, 122, 123, 124 and 125 which are connected by their inputs to the channels EDG. The validation (enabling) of each of the circuits 121, 122, 123, 124 and 125 as well as that of the circuit 11 is done by the circuit 10. The circuit 14 comprises (as shown) in FIG. 2 a group of AND gates which connect the outputs of the circuits 121, 122, 123, 124 and 125 to the channels E when a signal appears at the output of the OR gates 17 of FIGS. 1 and 2. The table below gives the respective functions of the circuits 121 to 125 and examples of the different types of information emitted by these circuits and transmitted to the unit P1 through the channels E.

| No. of Circuit | Function of the Circuit | Different pieces of information transmitted to the unit P1 through the circuit |
|---|---|---|
| 121 | Selector of the method of reaction to faults | error ignored<br>display concerning detected error<br>control of execution of test microprograms residing in the unit P1. |
| 122 | Address generator for an element of the unit P1 | destination address of a data item to be introduced into the unit P1<br>address of origin of a data item to be withdrawn from the unit P1. |
| 123 | Generator of data to be introduced into an element of the unit P1 | data employed by a microprogram<br>data employed in diagnosis operations. |
| 124 | Selector of a maintenance function | method of diagnosis:<br>microprograms inscribed in the unit P1<br>by microprograms inscribed in the unit P2<br>program method<br>method of program access |
| 125 | Selector of orders to be executed by the unit P1 | disconnection<br>correction of error<br>"local" setting to an initial<br>validation of access<br>execution of a phase<br>stop<br>start<br>display |

Figure 2:
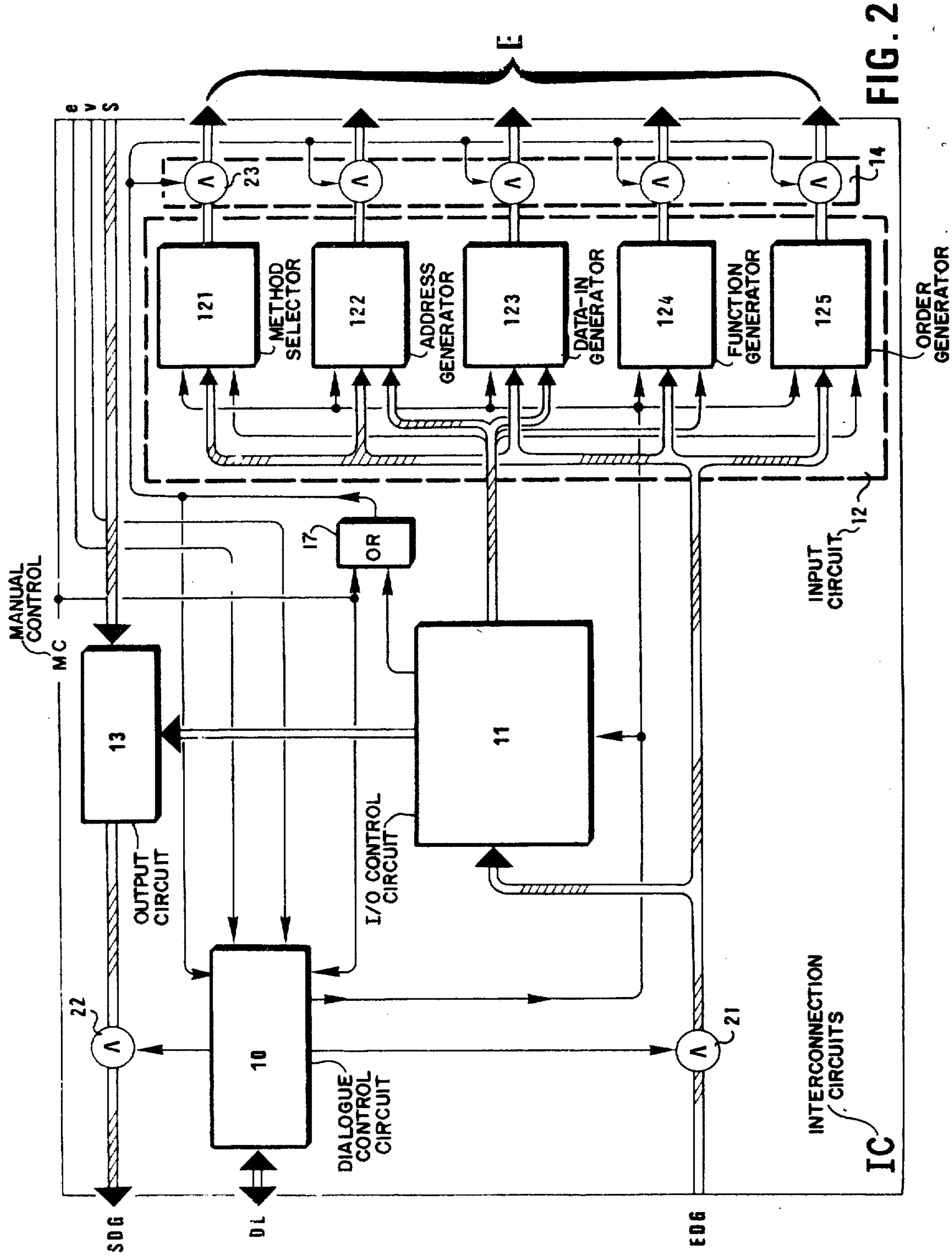
FIG. 2 is a schematic diagram of the interconnection circuits of a test and diagnosis device in accordance with the invention.

The circuit 13 of FIGS. 1 and 2 is selector controlled by the circuit 11 so that the signals sent through the channels SDG originates with the element of the unit P1 selected by the circuit 11.

Figure 3:
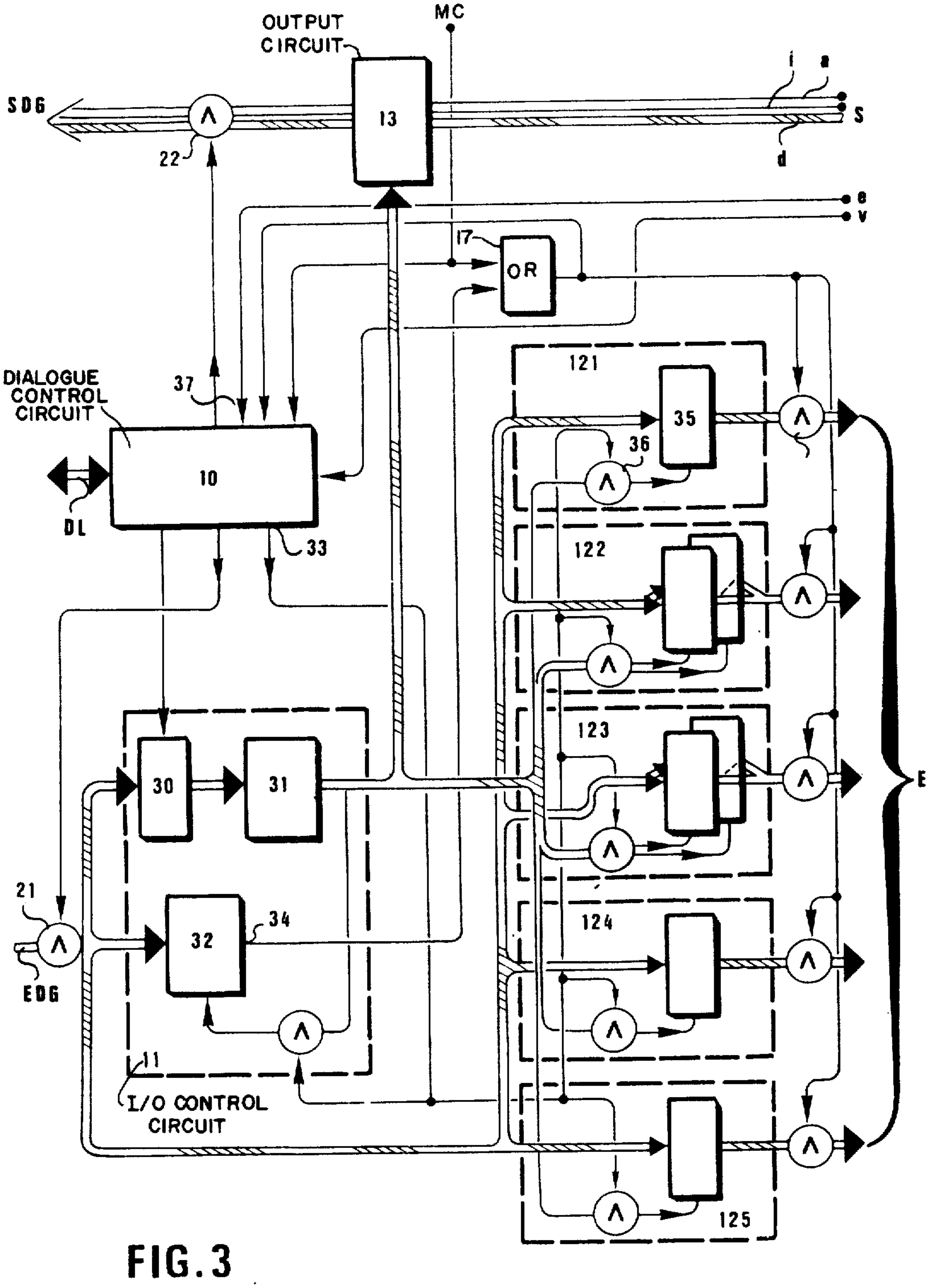
FIG. 3 is a diagram of an embodiment of the interconnection circuits of a test and diagnosis device in accordance with the invention of which a schematic diagram is given in FIG. 2.

FIG. 3 shows an embodiment of the circuits IC of FIG. 2. The circuit 11 comprises a register 30 validated by the circuit 10. The register 30 is loaded through the channels EDG for each input and output microdialogue and its content is decoded by the circuit 31 which controls either at least one of the circuits 121, 122, 123, 124, 125 during an input microdialogue or the circuit 13 during an output microdialogue. The circuit 11 likewise comprises a circuit 32 connected to the channels EDG and to one output of the decoder 31 by means of an AND gate connected to one of the outputs 33 of the circuit 10. The circuit 32 designed in a known manner and comprising, for example, a comparator, sets up at its output 34 a signal for automatic connection of the unit P2 to the unit P1 by the introduction of a predetermined set of signals through the channels EDG, introduced into the register 30 through the channels EDG and decoded by the decoder 31. Each of the circuits 121, 122, 123, 124, 125 comprises at least one register similar to the register 35 of circuit 121, the inputs of which are connected to the channels EDG and at least one AND gate (such as the gate 36 of circuit 121) of which one input is connected to the output 33 of the circuit 10 and the other input is connected to one of the outputs of the circuit 31. The presence of a signal at the output of an AND gate 36 controls (enables) the loading of the register 35 with an set of signals proceeding from the channels EDG. The outputs of the circuits 121, 122, 123, 124, 125 are connected through the registers to the channels E as in FIGS. 1, 2 and 3. The circuit 13 as in FIGS. 1, 2 and 3 is controlled by the outputs of the circuit 31 in FIG. 3 in order to transfer through the channels S and SDG at least one of the signal groups signal groups generated by the unit P1. These pieces of information are data corresponding to the contents of a memory element of the unit P1 and may include either a signal *a* for stopping the clock circuits of the unit P1 or a signal *i* for interruption of the execution of a microprogram or of a program in the unit P1. The signal *e* for an abnormal operational condition at the input 37 of the circuit 10 (proceeding from one of the elements of the unit P1) is set up, for example, in the following cases:

- a major error in one of the circuits of the unit P1, which makes necessary the stopping of its clock circuits and also sets up the signal *a;*
- a minor error in one of the circuits of the unit P1, which makes necessary the interruption of the execution of a microprogram and also sets up the signal *i;*
- error in a program introduced into a memory of the unit P1, which makes necessary the interruption of the execution of this program and also sets up the signal *i.*

By a check of parity (or of disparity) of the data circulating in the circuits IC and in the error detection circuits associated with the circuits IC (not here shown) a supplementary signal not shown in FIG. 3 may indicate to the circuit 10 the presence of an error in the test and diagnosis circuits contained in the unit P1 and release a dialogue between the unit P2 and the unit P1. Through the signal *e* or a signal proceeding from the manual control MC the circuit 10 carries out a demand for dialogue through the channels DL, to the unit P2. This call from the unit P1 enables the unit P2 to accede automatically to a program of test and diagnosis of the unit P1 in a manner not described here, which depends on the internal structure of the unit P2 and departs from the scope of the present invention. The call from the unit P1 likewise enables the unit P2 to accede to microprograms contained in the unit P2.

Either through the manual control MC or through an automatic control effected by special first input microdialogue which causes only the circuit 11 to come into play, the unit P2 is connected to the unit P1 in order to communicate with it through a succession of input-output microdialogues. The communication is checked (validated) by the circuit 10 which is connected to the channels EDG and SDG respectively by two groups of AND gates 21 and 22 as FIGS. 1, 2 and 3. Through at least one input microdialogue and one output microdialogue the unit P1 communicates to the unit P2 its state, after detection of at least one fault produced in one of its elements, through the signal *i* or the signal *a.* Through the channels *d* connected to the channels SDG, the unit P1 can transmit at least one fault symptom, thus giving to the unit P2 the information necessary for controlling the circuits IC for reaction to the fault (or faults) detected. Depending on the nature of the fault, either the error is ignored and the execution of the interrupted microprogram (or the program) is pursued, or the display of data is executed in order to carry out a diagnosis, or an order for execution of microprograms of test and diagnosis of the unit P1 is given. These microprograms may be memorized in one of the elements of the unit P1 as described in the co-pending U.S. Pat. Application Ser. No. 450,936, filed Mar. 13, 1974, entitled "Testing System For A Data Processing Unit" by Gilles Jean Marcel Bottard which corresponds to the French Pat. application No. 73 09558, filed on the 16th Mar. 1973.

The unit P1 may be the central processing unit of a data processing system. A particular embodiment consists in employing as the unit P2 a peripheral control unit belonging to the system. The unit P2 executes a program of test and diagnosis of the central processing unit which is inscribed beforehand on one of the peripherals connected to the control unit P2 and enables a dialogue with an operator by means of a desk comprising a keyboard and a typewriter or a cathode screen. In another embodiment the unit P2 may be a data processing unit external to the processing system under consideration. Thus, due to the maintenance circuits introduced into the unit P1 to be tested and diagnosed by the unit P2, belonging or not to the same system as the unit P1, one or a number of faults can be located by local operation of the system or remotely (by telephone connection, for example). In the case of a diagnosis remotely controlled by an operator, the test card index may likewise be remote.

What is claimed is:

1. In a test and diagnosis device for a first data processing unit including a plurality of operative elements, said device comprising:

first means external to the first unit for manual control and display of data usable for testing and diagnosing manually the first unit in the event of trouble;

a second data processing unit;

a first channel group for bidirectional transmission of control signals for exchange of information between said data processing units;

a second channel group for transmission of information from said second unit;

a third channel group for transmission of information from said first unit to said second unit; and a plurality of interconnection circuits contained in the first unit and connected to said operative elements thereof;

maintenance circuits comprised in said interconnection circuits and operative for connecting said first unit to said second unit for transmitting signals from one unit to the other under the control of said second unit, said signals comprising a succession of input-output microdialogues, said maintenance circuits comprising:

a first circuit for controlling the input-output microdialogue between said first unit and said second unit, said first circuit connected to said first channel group and to said operative elements within said first unit, a second circuit for controlling the input-output microdialogues between said units, said second circuit validated by said first circuit and connected to said second channel group, a third circuit validated by said first circuit and controlled by said second circuit, said third circuit connected to said second channel group and to said operative elements of said first unit, a fourth circuit validated by said first circuit and controlled by said second circuit and connected to said operative elements of said first unit and to said third channel group said first circuit responsive to a signal of abnormal operational condition sent by at leat one element of said first unit to said first circuit for enabling an exchange of signals between said second unit and said first circuit through said first channel group for validating input microdialogues and output microdialogues, each of said input microdialogues comprising transmission of signals through said second channel group to said second circuit followed by a transmission of signals through said second channel group to said third circuit under the control of said second circuit, each of said output microdialogues comprising a transmission of signals through said second channel group to said second circuit followed by a transmission of signals through said third channel group by said fourth circuit under the control of said second circuits, whereby said first unit may be tested and diagnosed automatically.

2. In a test and diagnosis device for a first data processing unit, maintenance circuits as in claim 1, wherein said third circuit comprises a plurality of additional circuits having input terminals connected in parallel to said second channel group and output terminals connected to respective elements of said first unit, said additional circuits enabling a said apparatus to perform a plurality of testing and diagnostic functions on said first unit.

3. In a test and diagnosis device for a first data processing unit, maintenance circuits as in claim 2, wherein each of said additional circuits comprises:

at least one register, input terminals of said register directly connected to said second channel group and output terminals of said registers connected to said elements of said first unit, and at least one AND gate, one input terminal of said AND gate connected to said first circuit, another input terminal connected to said second channel group through said second circuit, and an output terminal of said AND gate connected to said register for selectively enabling the loading of said register through said second channel group.

4. In a test and diagnosis device for a first data processing unit, maintenance circuits as in claim 1, wherein said second circuit comprises:

a register for connecting input terminals of said second circuit to said second channel group, a decoder for connecting output terminals of said second circuit to said third and fourth circuits, input terminals of said decoder connected to output terminals of said register for decoding signals received through said second channel group, said second circuit for controlling said third circuit in the course of an input microdialogue and for controlling said fourth circuit in the course of an output microdialogue.

5. In a test and diagnosis device for a first data processing unit, maintenance circuits as in claim 1 wherein said fourth circuit comprises a selector for gating signals proceeding from an element of said first unit to said third channel group.

6. In a test and diagnosis device for a first data processing unit, maintenance circuits as in claim 1, wherein said first circuit is connected to said second channel group by a first group of AND gates for validating the transfer of signals sent from said second unit to said second and said third circuits, said first circuit also connected to said third channel group by a second group of AND gates for validating the transfer of signals sent from at least one element of said first unit to said second unit.

7. In a test and diagnosis device for a first data processing unit, maintenance circuits as in claim 1 further comprising:

switching means, a first group of input terminals of said switching means connected to the output terminals of said third circuit, a second group of input terminals of said switching means connected to said first means, and output terminals of said switching means connected to said elements of said first unit for enabling automatic and manual test and diagnosis of said first unit.

8. In a test and diagnosis device for a first data processing unit, maintenance circuits as in claim 7, further comprising:

an OR gate, and manual control means, one input terminal of said OR gate connected to said manual control means, another input terminal of said OR gate connected to said second circuit, an output terminal of said OR gate connected to said switching means for enabling externally controlled testing and diagnosing of said first unit by said manual control means and automatically controlling the testing and diagnosing of said first unit by said second unit.

9. In a test and diagnosis device for a first data processing unit, maintenance circuits as in claim 8 wherein said second circuit comprises:

a fifth circuit, a decoder, and an AND gate, said fifth circuit validated by a signal from an output terminal of said AND gate, one input terminal of said AND gate connected to said decoder, another input terminal of said AND gate connected to said first circuit, said AND gate for enabling transmission of a signal by said fifth circuit to one of the input terminals of said OR gate for enabling said automatic control by said second unit.

10. In a test and diagnosis device for a first data processing unit, maintenance circuits as in claim 1, further comprising means for sending a signal of abnormal operational condition of at least one of the elements of said first unit to said first circuit which causes said first circuit to enable the sending to said second unit through said first channel group a control signal for execution in said second unit of an automatic program of test and diagnosis of said first unit.

* * * * *